(12) United States Patent
Tamura et al.

(10) Patent No.: US 11,312,835 B2
(45) Date of Patent: Apr. 26, 2022

(54) EXPANDABLE POLYSTYRENE RESIN PARTICLES, POLYSTYRENE PRE-EXPANDED PARTICLES, AND FOAM MOLDED BODY

(71) Applicant: KANEKA CORPORATION, Osaka (JP)

(72) Inventors: Mitsuhiro Tamura, Hyogo (JP); Yoichi Ohara, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 116 days.

(21) Appl. No.: 16/780,121

(22) Filed: Feb. 3, 2020

(65) Prior Publication Data

US 2020/0172692 A1    Jun. 4, 2020

Related U.S. Application Data

(63) Continuation of application No. PCT/JP2018/028907, filed on Aug. 1, 2018.

(30) Foreign Application Priority Data

Aug. 4, 2017    (JP) .............................. JP2017-151473

(51) Int. Cl.
   *C08J 9/16*      (2006.01)
   *C08J 9/224*    (2006.01)
   *C08J 9/00*      (2006.01)
   *C08J 9/228*    (2006.01)

(52) U.S. Cl.
   CPC .............. *C08J 9/16* (2013.01); *C08J 9/0066* (2013.01); *C08J 9/224* (2013.01); *C08J 9/228* (2013.01); *C08J 2325/06* (2013.01); *C08J 2325/14* (2013.01); *C08J 2483/07* (2013.01)

(58) Field of Classification Search
   CPC ... C08J 9/16; C08J 9/0066; C08J 9/224; C08J 9/228; C08J 2325/06; C08J 2325/14; C08J 2483/07; C08J 2201/034; C08J 9/141; C08J 2203/14; C08J 9/18; C08J 9/0061; C08J 9/232; C08F 290/00
   See application file for complete search history.

(56) References Cited

U.S. PATENT DOCUMENTS

| | | | |
|---|---|---|---|
| 3,657,164 A | 4/1972 | Horst et al. | |
| 4,238,570 A * | 12/1980 | Shibata | ................... C08J 9/224 427/222 |
| 4,351,910 A | 9/1982 | Sugitani et al. | |
| 2009/0197069 A1 | 8/2009 | Suzuki et al. | |

FOREIGN PATENT DOCUMENTS

| | | |
|---|---|---|
| CN | 1553929 A | 12/2004 |
| GB | 1241132 A | 7/1971 |
| JP | 47013059 B2 | 4/1972 |
| JP | S57051729 A | 3/1982 |
| JP | H4202443 A | 7/1992 |
| JP | H05054854 B2 | 8/1993 |
| JP | H8109279 A | 4/1996 |
| JP | 2004155870 A | 6/2004 |
| JP | 2008231175 A | 10/2008 |
| JP | 2008260795 A | 10/2008 |
| JP | 2012167148 A | 9/2012 |
| JP | 2013006966 A | 1/2013 |
| JP | 2014193950 A | 10/2014 |
| JP | 2015214641 A | 12/2015 |
| JP | 2016183255 A | 10/2016 |
| JP | 2018145285 A | 9/2018 |
| WO | 2006106653 A1 | 10/2006 |
| WO | 2010/095444 A1 | 8/2010 |
| WO | 2011/030762 A1 | 3/2011 |

OTHER PUBLICATIONS

International Search Report issued in corresponding International Application No. PCT/JP2018/028907; dated Sep. 18, 2018 (2 pages).
International Preliminary Report on Patentability issued in corresponding International Application No. PCT/JP2018/028907; dated Feb. 13, 2020 (7 pages).
International Search Report issued in International Application No. PCT/JP2018/028881; dated Oct. 30, 2018 (2 pages).
International Preliminary Report on Patentability issued in International Application No. PCT/JP2018/028881; dated Feb. 13, 2020 (10 pages).
Office Action issued in corresponding Chinese Patent Application No. 201880050364.7 dated Nov. 16, 2021 (15 pages).
Office Action issued in corresponding Chinese Patent Application No. 201880050698.4 dated Nov. 26, 2021 (13 pages).

* cited by examiner

*Primary Examiner* — Irina S Zemel

(74) *Attorney, Agent, or Firm* — Osha Bergman Watanabe & Burton LLP

(57) ABSTRACT

Expandable polystyrene-based resin particles may include a styrene-based monomer, a polysiloxane-containing macro monomer, and a coating composition having a melting point of 40° C. or greater. A coefficient of static friction of a foamed molded product, obtained by pre-expanding the expandable polystyrene-based resin particles and molding the pre-expanded expandable polystyrene-based resin particles, may be 4.0 or less. The expandable polystyrene-based resin particles may have a surface layer part that contains polysiloxane as a main component.

6 Claims, No Drawings

EXPANDABLE POLYSTYRENE RESIN PARTICLES, POLYSTYRENE PRE-EXPANDED PARTICLES, AND FOAM MOLDED BODY

TECHNICAL FIELD

One or more embodiments relate to (i) expandable polystyrene-based resin particles containing a styrene-based monomer and a polysiloxane-containing macro monomer, (ii) pre-expanded polystyrene-based particles, and (iii) a foamed molded product.

BACKGROUND

A polystyrene-based foamed molded product is widely used for, for example, a container, a packing material, a construction and civil engineering member, an automobile member due to its lightweight property and cushioning performance.

Note, however, that foamed molded products composed of an expandable polystyrene-based resin may produce, in a case where such foamed molded products are rubbed together or rubbed against, for example, another resin member or a steel plate, an annoying (squeaky) rubbing sound. Particularly in the field of automobile members, vibrations are easily caused by, for example, traveling over a bad road. Thus, production of a rubbing sound causes a worse feeling of use of a polystyrene-based foamed molded product.

A foamed molded product whose surface is coated with an aliphatic compound or a silicone-based compound or which is obtained by kneading an aliphatic compound or a silicone-based compound with resin particles is disclosed. For example, Patent Literature 1 discloses a method for preventing or reducing production of a rubbing sound by expandable polystyrene-based resin particles that (i) contain a copolymer of a polysiloxane-containing monomer and a styrene-based monomer and (ii) have surfaces on which polysiloxane is present.

However, molding, into molded products, of resin particles whose surfaces are coated with a silicone-based compound tends to cause a deterioration in fusion between resin particles and consequently cause the molded products to have a lower strength. Furthermore, in a case where (i) resin particles fall off when the molded products are rubbed together or rubbed against another substance and (ii) the molded products have respective irregular surfaces, a coefficient of static friction may increase and produce a rubbing sound.

Patent Literature 2 discloses a foamed molded product containing (i) a polystyrene-based resin as a basic resin and (ii) a polyacrylic acid alkyl ester-based resin. Patent Literature 3 discloses a method for reducing a coefficient of static friction by composite resin particles containing a plant-derived polyethylene-based resin and a resin obtained by polymerizing a vinyl aromatic monomer.

Note, however, that such methods as disclosed in the above Patent Literatures are less effective in eliminating or reducing a rubbing sound.

Patent Literatures 4 and 5 each provide an example of a method of copolymerizing a macro monomer with a styrene-based monomer. Note, however, that neither the method disclosed in Patent Literature 4 nor the method disclosed in Patent Literature 5 uses the macro monomer in expectation of a rubbing sound eliminating or reducing effect.

CITATION LIST

[Patent Literature 1]
Japanese Patent Application Publication Tokukai No. 2016-183255
[Patent Literature 2]
Japanese Patent Application Publication Tokukai No. 2014-193950
[Patent Literature 3]
Japanese Patent Application Publication Tokukai No. 2013-006966
[Patent Literature 4]
Japanese Patent Application Publication Tokukai No. 2008-231175
[Patent Literature 5]
International Publication No. WO2006/106653

SUMMARY

One or more embodiments provide expandable polystyrene-based resin particles that (i) do not contaminate a pre-expanding machine and/or a molding mold, (ii) make it possible to eliminate or reduce a rubbing sound, and (ii) are highly fusible.

As a result of diligent study, the inventors have found that copolymerizing polysiloxane with only surfaces of polystyrene particles and further coating the surfaces with a coating composition having a melting point of not lower than 40° C., (i) an annoying sound produced when molded products are rubbed together or rubbed against another substance is eliminated or reduced, (ii) particles are restrained from falling off when the molded products are rubbed together or rubbed against another substance, and (iii) a rubbing sound eliminating or reducing effect is maintained for a long term. Specifically, one or more embodiments are arranged as below.

One or more embodiments relate to [1] expandable polystyrene-based resin particles containing: a styrene-based monomer; a polysiloxane-containing macro monomer; and a coating composition having a melting point of not lower than 40° C., a coefficient of static friction of a foamed molded product, obtained by pre-expanding the expandable polystyrene-based resin particles and molding the expandable polystyrene-based resin particles pre-expanded, being not more than 4.0.

One or more embodiments provide expandable polystyrene-based resin particles from which a foamed molded product that makes it possible to eliminate or reduce a rubbing sound is obtained without the fear of contaminating a pre-expanding machine and/or a molding mold.

DETAILED DESCRIPTION

The following description will discuss one or more embodiments. Note, however, that the present invention is not limited to such embodiments. The present invention is not limited to any configuration described below, but can be altered in many ways within the scope of the claims. Embodiments and/or examples derived from a proper combination of technical means disclosed in different embodiments and/or examples are also encompassed in the technical scope of the present invention. Any numerical range expressed as "A to B" herein means "not less than A (A or more) and not more than B (B or less)" unless otherwise specified.

Expandable polystyrene-based resin particles of one or more embodiments contain: a styrene-based monomer; a polysiloxane-containing macro monomer; and a coating composition having a melting point of not lower than 40° C., a coefficient of static friction of a foamed molded product, obtained by pre-expanding the expandable polystyrene-based resin particles and molding the expandable polystyrene-based resin particles pre-expanded, being not more than 4.0.

Examples of the styrene-based monomer used in one or more embodiments include styrene-based derivatives such as styrene, α-methylsthylene, paramethyl styrene, t-butyl styrene, and chlorstyrene. Each of these styrene-based monomers can be used alone. Alternatively, two or more of these styrene-based monomers can be mixed and used. In particular, styrene is preferable from the viewpoint of excellent expandability and excellent molding process ability.

According to one or more embodiments, a monomer that is copolymerizable with styrene can be added to a styrene-based monomer provided that such a monomer does not eliminate or reduce the effects of one or more embodiments. Examples of the monomer that is copolymerizable with styrene include acrylic and methacrylic esters such as methyl acrylate, butyl acrylate, methyl methacrylate, ethyl methacrylate, and cetyl methacrylate; monomers such as acrylonitrile, dimethyl fumarate, and ethyl fumarate; and bifunctional monomers such as divinylbenzene and alkylene glycol dimethacrylate. These monomers that are copolymerizable with styrene can be used in one kind or two or more kinds to be subjected to copolymerization.

According to one or more embodiments, such a monomer(s) is/are added to the styrene-based monomer. Thus, a total amount of the styrene-based monomer and other monomer(s) that is/are copolymerizable with the styrene-based monomer is preferably not less than 89.0% by weight and not more than 99.5% by weight with respect to 100% by weight of a copolymer.

The polysiloxane-containing macro monomer of one or more embodiments has a functional group so as to be copolymerized with the styrene-based monomer. At least one molecule of the polysiloxane-containing macro monomer preferably has a plurality of functional groups in a side chain or at respective both terminals. A functional group equivalent of the functional groups is preferably not less than 100 g/mol and not more than 20,000 g/mol, and more preferably not less than 1,000 g/mol and not more than 10,000 g/mol. The functional group equivalent which is less than 100 g/mol causes an increase in polymerization of polysiloxane-containing macro monomers. This tends to make it difficult to obtain a copolymer of a polysiloxane-containing macro monomer and styrene. The functional group equivalent which is more than 20,000 g/mol causes the polysiloxane-containing macro monomer to be less reactive with the styrene-based monomer. This tends to make it difficult for the polysiloxane-containing macro monomer to be copolymerized with the styrene-based monomer.

A method for obtaining the polysiloxane-containing macro monomer is exemplified by, but not particularly limited to, a solution polymerization method, a suspension polymerization method, and an emulsion polymerization method.

A polysiloxane-containing macro monomer of one or more embodiments having a functional group at least in a side chain (hereinafter also referred to as a "side chain type polysiloxane-containing macro monomer") can be produced by, for example, a method of carrying out polymerization of cyclic, linear, or branched organosiloxane (preferably cyclic organosiloxane) with use of a catalyst such as an acid, an alkali, a salt, or a fluorine compound. The organosiloxane used in the above polymerization has a weight average molecular weight (Mw) in terms of polystyrene of preferably not more than 20,000, and more preferably not more than 10,000. The above method can be more preferably exemplified by a method of using not only the above organosiloxane but also silane having a functional group and/or cyclic, linear, or branched organosiloxane having a functional group.

The above method can alternatively be exemplified by a method of equilibrating, in a solution, a slurry, or an emulsion in the presence of, for example, a catalyst similar to that mentioned earlier, polysiloxane and preferably silane having a functional group and/or cyclic, linear, or branched organosiloxane having a functional group. The polysiloxane has a weight average molecular weight (Mw) in terms of polystyrene of preferably not less than 20,000, more preferably not less than 50,000, and even more preferably not less than 100,000.

A side chain type polysiloxane-containing macro monomer of one or more embodiments can be produced by, for example, a publicly known emulsion polymerization method described in Japanese Patent Application Publication Tokukai No. 2006-291122.

Specifically, a polysiloxane-containing macro monomer can be obtained with use of cyclic siloxane typified by 1,3,5,7-octamethylcyclotetrasiloxane and/or a functional group(s) such as (i) hydrolyzable group-containing bifunctional silane (e.g., dimethyldimethoxysilane), (ii) if necessary, 3 or more-functional alkoxysilane (e.g., methyltriethoxysilane or tetrapropyl oxysilane) and a condensate of 3 or more-functional silane (e.g., methyl orthosilicate), and (iii) if necessary, mercaptopropyl dimethoxymethylsilane, acryloyloxypropyl dimethoxymethylsilane, methacryloyloxy propyl dimethoxymethylsilane, vinyldimethoxymethylsilane, and vinylphenyl dimethoxymethylsilane. Of the above silanes, methacryloyloxy propyl dimethoxymethylsilane is preferable from the viewpoint of copolymerization with the styrene-based monomer.

The polysiloxane-containing macro monomer of one or more embodiments has a viscosity (kinematic viscosity) at 25° C. of preferably not less than 10 $mm^2/s$, and more preferably not less than 50 $mm^2/s$. The polysiloxane-containing macro monomer which has a higher viscosity has a longer siloxane chain. This makes it easier to bring about a rubbing sound eliminating or reducing effect.

Polysiloxane, which is a main chain of the polysiloxane-containing macro monomer of one or more embodiments, has a weight average molecular weight in terms of polystyrene, found with use of GPC, of preferably not less than 1,000 and not more than 500,000, and more preferably not less than 3,000 and not more than 300,000. The polysiloxane which has a greater molecular weight has a longer siloxane chain. This makes it easier to bring about a rubbing sound eliminating or reducing effect. However, the polysiloxane-containing macro monomer which has a too high viscosity is less handleable and consequently difficult to polymerize.

A functional group of the polysiloxane-containing macro monomer used in one or more embodiments is not limited to any particular functional group provided that the functional group reacts with the styrene-based monomer. A vinyl group is preferable due to its reactivity with the styrene-based monomer. Of functional groups including a vinyl group, a methacryloyl group or an acryloyl group is more preferable due to its reactivity with the styrene-based monomer.

Examples of the main chain of the polysiloxane-containing macro monomer of one or more embodiments include polyorganosiloxanes such as polydimethylsiloxane, polymethylphenylsiloxane, and a polydimethylsiloxane-diphenylsiloxane copolymer; and polyorganohydrogen siloxanes in which side chain alkyl groups are partially replaced with hydrogen atoms. Of the above main chains, polydimethylsiloxane, polymethylphenylsiloxane, or a polydimethylsiloxane-diphenylsiloxane copolymer is more preferable. Furthermore, economically, polydimethylsiloxane, which is easily available, is the most preferable.

The polysiloxane-containing macro monomer of one or more embodiments has preferably not less than 1.5 functional groups, and more preferably not less than 1.7 functional groups. The polysiloxane-containing macro monomer which has less than 1.5 functional groups is less reactive with the styrene-based monomer. Thus, such a polysiloxane-containing macro monomer tends to be less easily copolymerized with the styrene-based monomer. The polysiloxane-containing macro monomer has not more than 50.0 functional groups, preferably not more than 30.0 functional groups, and more preferably not more than 10.0 functional groups. The polysiloxane-containing macro monomer which has more than 50.0 functional groups causes polysiloxane-containing macro monomers to react with each other. This causes such a polysiloxane-containing macro monomer to be less reactive with the styrene-based monomer.

A base material resin constituting the expandable polystyrene-based resin particles of one or more embodiments preferably contains the styrene-based monomer in an amount of not less than 89.0% by weight and not more than 99.5% by weight and the polysiloxane-containing macro monomer in an amount of not less than 0.5% by weight and not more than 11.0% by weight, with respect to 100% by weight of a copolymer (note that "100% by weight of a copolymer" is synonymous with "a total amount of the styrene-based monomer and the polysiloxane-containing macro monomer is 100% by weight"), more preferably contains the styrene-based monomer in an amount of not less than 89.0% by weight and less than 99.5% by weight and the polysiloxane-containing macro monomer in an amount of more than 0.5% by weight and not more than 11.0% by weight, with respect to 100% by weight of the copolymer, and even more preferably contains the styrene-based monomer in an amount of not less than 89.8% by weight and not more than 99.2% by weight and the polysiloxane-containing macro monomer in an amount of not less than 0.8% by weight and not more than 10.2% by weight, with respect to 100% by weight of the copolymer. The polysiloxane-containing macro monomer which is contained in a larger amount causes an expanding agent to easily escape. Thus, expandable polystyrene-based resin particles tend to be less expandable and less moldable. This makes it difficult to obtain a foamed molded product that has a beautiful surface. The polysiloxane-containing macro monomer which is contained in a smaller amount is insufficient to bring about a rubbing sound eliminating or reducing effect. Alternatively, for example, the styrene-based monomer can be contained in an amount of not less than 96.7% by weight and not more than 98.8% by weight, and the polysiloxane-containing macro monomer can be contained in an amount of not less than 1.2% by weight and not more than 3.3% by weight. Further alternatively, the styrene-based monomer can be contained in an amount of not less than 97.5% by weight and not more than 98.5% by weight, and the polysiloxane-containing macro monomer can be contained in an amount of not less than 1.5% by weight and not more than 2.5% by weight.

According to one or more embodiments, examples of the coating composition having a melting point of not lower than 40° C. include fatty acid triglycerides such as triglyceride laurate, triglyceride stearate, triglyceride linoleate, and triglyceride hydroxystearate; fatty acid diglycerides such as diglyceride laurate, diglyceride stearate, and diglyceride linoleate; fatty acid monoglycerides such as monoglyceride laurate, monoglyceride stearate, and monoglyceride linoleate; and vegetable oils such as hardened castor oil. Each of these coating compositions can be used alone. Alternatively, two or more of these coating compositions can be mixed. Of the above coating compositions, triglyceride stearate and hardened castor oil, each of which promotes fusion of a foamed molded product, are preferable. Furthermore, such a coating composition can be added to an aqueous system during impregnation of the expanding agent into the polystyrene-based resin particles, or can be added after dehydration or after drying so that the expandable polystyrene-based resin particles are covered with the coating composition. It is not particularly limited how to cover the expandable polystyrene-based resin particles with the coating composition. The expandable polystyrene-based resin particles are preferably covered with the coating composition by adding the coating composition after drying and then mixing and stirring the expandable polystyrene-based resin particles and the coating composition. The expandable polystyrene-based resin particles are covered with the coating composition by, for example, (i) a method in which the expandable polystyrene-based resin particles and the coating composition are blended together by placing the expandable polystyrene-based resin particles and the coating composition in a bag and shaking the bag with a hand or (ii) a method in which the expandable polystyrene-based resin particles and the coating composition are blended together with use of a blending machine such as a ribbon mixer, Supermixer, Nauta mixer, or PAM Apexmixer.

The coating composition of one or more embodiments has a melting point of not lower than 40° C. The coating composition which has a melting point of lower than 40° C. may be liquefied at a normal temperature. Such a coating composition tends to cause a deterioration in fusibility during molding. The coating composition has a melting point of not higher than 150° C., preferably not higher than 120° C., and more preferably not higher than 100° C. The coating composition which has a melting point higher than 150° C. is not melted during a molding process. Such a coating composition tends to be less effective in promotion of fusion.

The coating composition of one or more embodiments is added in an amount of preferably not less than 0.02 parts by weight and not more than 0.50 parts by weight, and more preferably not less than 0.03 parts by weight and not more than 0.20 parts by weight. The coating composition which is added in an amount of less than 0.02 parts by weight tends to make it impossible to bring about a fusion promoting effect. In contrast, the coating composition which is added in an amount of more than 0.50 parts by weight tends to cause a foamed molded product to have a less beautiful surface due to erosion of surfaces of the expandable polystyrene-based resin particles.

According to one or more embodiments, the coefficient of static friction is preferably not more than 4.0, and more preferably not more than 3.0. The coefficient of static friction which coefficient is more than 4.0 causes molded products to be less smoothly rubbed together or rubbed against another substance. This tends to cause a rubbing sound to be less effectively eliminated or reduced.

The expandable polystyrene-based resin particles of one or more embodiments each preferably have a surface layer part which contains polysiloxane as a main component.

The term "surface layer part" of one or more embodiments refers to an area that is not less than 30 nm and not more than 250 nm below an outermost layer of an expandable polystyrene-based resin particle. The expression "which contains polysiloxane as a main component" means a state in which a polysiloxane component is contained in an amount of not less than 50% by weight, preferably not less than 70% by weight, and more preferably not less than 90% by weight, with respect to 100% by weight of the copolymer.

The polysiloxane component of one or more embodiments, which is contained in an amount of less than 50% by weight, tends to make it difficult to bring about a rubbing sound eliminating or reducing effect.

An amount of a gel component in the expandable polystyrene-based resin particles of one or more embodiments, the gel component being insoluble in THF, is preferably not less than 5 wt % and not more than 45 wt %, and more preferably not less than 12 wt % and not more than 40 wt %. In a case where the amount of the gel component is less than 5 wt %, a rubbing sound eliminating or reducing effect is less sufficiently achieved. In a case where the amount of the gel component is more than 45 wt %, expandable polystyrene-based resin particles tend to be less expandable and moldable. This tends to make it difficult to obtain a foamed molded product that has a beautiful surface.

A component in the expandable polystyrene-based resin particles of one or more embodiments, the component being soluble in THF, has a weight average molecular weight in terms of polystyrene, measured with use of GPC, of preferably not less than 200,000 and not more than 400,000, and more preferably not less than 250,000 and not more than 350,000. In a case where the component in the expandable polystyrene-based resin particles, the component being soluble in THF, has a light weight average molecular weight, a foamed molded product that is used as a member tends to deteriorate in mechanical strength (e.g., compressive strength). In a case where the component in the expandable polystyrene-based resin particles, the component being soluble in THF, has a great weight average molecular weight, it is difficult to obtain a molded product that has a good surface property. According to one or more embodiments, in order to adjust a molecular weight, it is possible to use, as a monomer that is copolymerizable with styrene, a bifunctional monomer such as divinylbenzene or hexanediol di(meth)acrylate.

The expandable polystyrene-based resin particles of one or more embodiments can be produced by, for example, (i) a method (hereinafter also referred to as "suspension polymerization") of polymerizing a styrene-based monomer in an aqueous suspension and subsequently polymerizing a resultant mixture by adding a polysiloxane-containing macro monomer to the mixture or (ii) a so-called seed polymerization method of (a) impregnating a styrene-based monomer and a polysiloxane-containing macro monomer into polystyrene-based resin particles by continuously or intermittently adding the styrene-based monomer and the polysiloxane-containing macro monomer to an aqueous suspension containing the polystyrene-based resin particles and (b) polymerizing a resultant mixture. Of the above methods, the seed polymerization method is more preferable because the seed polymerization method (i) makes it possible to obtain particles having a uniform particle size, (ii) makes it easy to obtain a core-shell structure, and (iii) achieves good dispersion stability.

The aqueous suspension refers to water or an aqueous solution in which polystyrene-based resin particles and a monomer liquid drop are dispersed. A surfactant and a monomer each of which is soluble in water can be dissolved in the aqueous suspension. A dispersing agent, an initiator, a chain transfer agent, a crosslinking agent, a cell adjusting agent, a flame retarder, a plasticizing agent, and the like each of which is insoluble in water can alternatively be dispersed in the aqueous suspension.

In one or more embodiments, a weight ratio between the expandable polystyrene-based resin particles and water is preferably in the range of 1.0/0.6 to 1.0/3.0 in terms of a ratio between resultant expandable polystyrene-based resin particles and water.

According to one or more embodiments, it is preferable that suspension polymerization and seed polymerization be carried out by (i) carrying out main reactions thereof by carrying out first stage polymerization and then (ii) reducing a residual monomer by carrying out a second stage polymerization reaction at a temperature higher than the temperature at which the first stage polymerization is carried out.

A polymerization initiator that is used to carry out the first stage polymerization can be a radical generating polymerization initiator that is commonly used to produce a thermoplastic polymer. Typical examples of the polymerization initiator include organic peroxides such as benzoyl peroxide, lauroyl peroxide, t-butylperoxy benzoate, isopropyl-t-butylperoxy carbonate, butyl perbenzoate, t-butylperoxy-2-ethylhexanoate, t-butyl perpivalate, t-butylperoxy isopropylcarbonate, di-t-butylperoxy hexahydroterephthalate, 1,1-di (t-butylperoxy)3,3,5-trimethylcyclohexane, 1,1-bis(t-amylperoxy)-3,3,5-trimethylcyclohexane, 1,1-di(t-butylperoxy)cyclohexane, and t-butylperoxy-2-ethylhexyl monocarbonate; and azo compounds such as azobisisobutyronitrile and azobisdimethylvaleronitrile. Each of these polymerization initiators can be used alone. Alternatively, two or more of these polymerization initiators can be used in combination.

Examples of a dispersing agent that can be used to carry out the suspension polymerization and the seed polymerization include poorly water-soluble inorganic salts such as tricalcium phosphate, magnesium pyrophosphate, hydroxyapatite, and kaolin; and water-soluble polymers such as polyvinyl alcohol, methyl cellulose, polyacrylamide, and polyvinylpyrrolidone. In a case where a poorly water-soluble inorganic salt is used, it is effective to use, in combination, an anionic surfactant such as α-olefin sodium sulfonate or dodecylbenzene sodium sulfonate. Such a dispersing agent can be added as appropriate during polymerization.

Though depending on a kind, the dispersing agent which is a poorly water-soluble inorganic salt is preferably used in an amount of not less than 0.1 parts by weight and not more than 3.0 parts by weight with respect to 100 parts by weight of water. In contrast, the dispersing agent which is an anionic surfactant or a water-soluble polymer is preferably used in an amount of not less than 30 ppm and not more than 500 ppm with respect to 100 parts by weight of water.

Examples of the expanding agent include volatile expanding agents such as (i) aliphatic hydrocarbons, each of which is a hydrocarbon having not less than 3 to 5 carbon atoms, such as propane, isobutane, normal butane, isopentane, normal pentane, and neopentane and (ii) hydrofluorocarbons, each of which has an ozone depletion potential of 0 (zero), such as difluoroethane and tetrafluoroethane. These expanding agents are allowed to be used in combination. The expanding agent is used in an amount of preferably not less than 4 parts by weight and not more than 10 parts by weight, and more preferably not less than 5 parts by weight and not more than 9 parts by weight, with respect to 100 parts by weight of the polystyrene-based resin particles. The expanding agent which is used in a small amount makes it difficult to obtain an expansion ratio. In contrast, the expanding agent which is used in a great amount easily causes agglomeration of resins during a step of impregnating the expanding agent into the polystyrene-based resin particles.

According to one or more embodiments, the polysiloxane-containing macro monomer is added when a rate of conversion into the polystyrene-based resin particles through polymerization (hereinafter may also be referred to as a "polymerization conversion rate") is not less than 60% and not more than 99%, and more preferably not less than 75% and not more than 95%. In a case where the polysiloxane-containing macro monomer is added when the polymerization conversion rate is less than 60%, abnormal polymerization tends to occur due to agglomeration of particles. In a case where the polysiloxane-containing macro monomer is added when the polymerization conversion rate is more than 99%, a polymerization reaction between the polystyrene-based resin particles and the polysiloxane-containing macro monomer tends not to progress, and thus agglomeration tends to occur.

According to one or more embodiments, the polysiloxane-containing macro monomer is added at a rate of not less than 0.2% by weight/hr and not more than 10.0% by weight/hr, and more preferably not less than 0.4% by weight/hr and not more than 8.0% by weight/hr, with respect to 100% by weight of the copolymer. Addition of the polysiloxane-containing macro monomer at a rate of less than 0.2% by weight/hr reduces productivity and thus is unsuited for mass production. Addition of the polysiloxane-containing macro monomer at a rate of more than 10.0% by weight/hr tends to cause abnormal polymerization due to agglomeration of resin particles that are being polymerized.

According to one or more embodiments, a radical generating initiator, together with the polysiloxane-containing macro monomer, is preferably added when a rate of conversion of the styrene-based monomer into a polymer is not less than 60% and not more than 99%. The radical generating initiator is preferably a peroxide-based and/or azo compound-based initiator, and more preferably a peroxide-based initiator. Typical examples of the peroxide-based initiator include organic peroxides such as benzoyl peroxide, lauroyl peroxide, t-butylperoxy benzoate, isopropyl-t-butylperoxy carbonate, butyl perbenzoate, t-butylperoxy-2-ethylhexanoate, t-butyl perpivalate, t-butylperoxy isopropylcarbonate, di-t-butylperoxy hexahydroterephthalate, 1,1-di(t-butylperoxy)3,3,5-trimethylcyclohexane, 1,1-bis(t-amylperoxy)-3,3,5-trimethylcyclohexane, 1,1-di(t-butylperoxy)cyclohexane, and t-butylperoxy-2-ethylhexyl monocarbonate. Typical examples of the azo compound-based initiator include azo compounds such as azobisisobutyronitrile and azobisdimethylvaleronitrile. Each of these polymerization initiators can be used alone. Alternatively, two or more of these polymerization initiators can be used in combination.

Furthermore, in one or more embodiments when a rate of conversion of the styrene-based monomer into a polymer is not less than 60% and not more than 99%, the polysiloxane-containing macro monomer, together with the radical generating initiator, is preferably added, with respect to 100% by weight of the copolymer, in an amount of not less than 0.5% by weight and not more than 11.0% by weight at a rate of not less than 0.2% by weight/hr and not more than 10.0% by weight/hr.

As an additive(s) used in one or more embodiments, a solvent, a plasticizing agent, a cell adjusting agent, a flame retarder, and/or the like can be used for any purpose.

The solvent of one or more embodiments can be a solvent having a boiling point of not lower than 50° C. Examples of such a solvent include aliphatic hydrocarbons each having 6 or more carbon atoms, such as toluene, hexane, and heptane; and alicyclic hydrocarbons each having 6 or more carbon atoms, such as cyclohexane and cyclooctane.

The plasticizing agent of one or more embodiments can be a high boiling point plasticizing agent having a boiling point of not lower than 200° C. Examples of such a high boiling point plasticizing agent include fatty acid glycerides such as triglyceride stearate, triglyceride palmitate, triglyceride laurate, diglyceride stearate, monoglyceride stearate; vegetable oils such as coconut oil, palm oil, and palm kernel oil; aliphatic esters such as dioctyl adipate and dibutyl sebacate; and organic hydrocarbons such as liquid paraffin and cyclohexane.

Examples of the cell adjusting agent include aliphatic bisamides such as methylenebisstearylamide and ethylenebisstearylamide; and polyethylene wax.

The flame retarder and an auxiliary flame retarder each used in one or more embodiments can be a publicly known and commonly used flame retarder and a publicly known and commonly used auxiliary flame retarder, respectively.

Specific examples of the flame retarder include halogenated aliphatic hydrocarbon-based compounds such as hexabromocyclododecane, tetrabromobutane, and hexabromocyclohexane; brominated phenols such as tetrabromobisphenol A, tetrabromobisphenol F, and 2,4,6-tribromophenol; brominated phenol derivatives such as tetrabromobisphenol A-bis(2,3-dibromopropyl ether), tetrabromobisphenol A-bis(2,3-dibromo-2-methylpropyl ether), tetrabromobisphenol A-diglycidyl ether, and 2,2-bis[4'(2'',3''-dibromoalkoxy)-3', 5'-dibromophenyl]-propane; brominated butadiene-vinyl aromatic hydrocarbon copolymers such as a brominated styrene-butadiene block copolymer, a brominated random styrene-butadiene copolymer, and a brominated styrene-butadiene graft copolymer (e.g., EMERALD3000 manufactured by Chemtura Corporation and a compound disclosed in Published Japanese Translation of PCT International Application Tokuhyo No. 2009-516019). Each of these flame retarders can be used alone. Alternatively, two or more of these flame retarders can be mixed and used.

Specific examples of the auxiliary flame retarder include initiators such as cumene hydroperoxide, dicumyl peroxide, t-butylhydroperoxide, and 2,3-dimethyl-2,3-diphenylbutane.

Resultant expandable polystyrene-based resin particles can be made into pre-expanded particles by a common pre-expansion method. Specifically, until a desired expansion ratio is achieved, expandable polystyrene-based resin particles are pre-expanded by (i) placing the expandable polystyrene-based resin particles in a container provided with a stirrer and then (ii) heating the expandable polystyrene-based resin particles with use of a heat source such as steam.

Furthermore, pre-expanded expandable polystyrene-based particles can be molded, by a common in-mold molding method, into a foamed molded product. Specifically, pre-expanded expandable polystyrene-based particles with which a mold that can be closed but cannot be sealed is filled are fused together by heating with use of steam, so that the pre-expanded expandable polystyrene-based particles are molded into a foamed molded product.

Evaluated were a rubbing sound and a coefficient of static friction of a foamed molded product of one or more embodiments, the foamed molded product being obtained by (i) pre-expanding expandable polystyrene-based resin particles so that pre-expanded expandable polystyrene-based particles have an expansion ratio of 45 times and (ii) molding the pre-expanded expandable polystyrene-based particles. The foamed molded product of one or more embodiments, a coefficient of static friction of which foamed molded product was measured, was produced under the following conditions.

<Conditions>

The expandable polystyrene-based resin particles to be classified with use of a sieve so as to have a predetermined particle size were pre-expanded, under a blowing vapor pressure of 0.09 MPa to 0.12 MPa, so as to have a volume magnification of 45 times. Then, resultant pre-expanded styrene-based particles were molded in a mold under a blowing vapor pressure of 0.07 MPa, so that a plate-like foamed molded product having a thickness of 25 mm, a length of 400 mm, and a width of 350 mm was obtained.

One or more embodiments encompass expandable polystyrene-based resin particles containing: a styrene-based monomer; a polysiloxane-containing macro monomer; and a coating composition having a melting point of not lower than 40° C., a coefficient of static friction of a foamed molded product, obtained by pre-expanding the expandable polystyrene-based resin particles and molding the expandable polystyrene-based resin particles pre-expanded, being not more than 4.0, the coefficient of static friction being a coefficient of static friction for which the foamed molded product which is produced under the following conditions is measured.

<Conditions>

The expandable polystyrene-based resin particles to be classified with use of a sieve so as to have a predetermined particle size were pre-expanded, under a blowing vapor pressure of 0.09 MPa to 0.12 MPa, so as to have a volume magnification of 45 times. Then, resultant pre-expanded styrene-based particles were molded in a mold under a blowing vapor pressure of 0.07 MPa, so that a plate-like foamed molded product having a thickness of 25 mm, a length of 400 mm, and a width of 350 mm is obtained.

One or more embodiments also encompass a foamed molded product that is obtained by pre-expanding expandable polystyrene-based resin particles and molding the expandable polystyrene-based resin particles pre-expanded, containing: a styrene-based monomer; a polysiloxane-containing macro monomer; and a coating composition having a melting point of not lower than 40° C., the foamed molded product having a coefficient of static friction of not more than 4.0.

A rubbing sound and a coefficient of static friction of a foamed molded product of one or more embodiments are determined independent of a method for pre-expanding expandable polystyrene-based resin particles and a type of an in-mold molding method, but depending on a kind and a contained amount of a polysiloxane-containing macro monomer that is present on surfaces of the expandable polystyrene-based resin particles. The coefficient of static friction is a characteristic numerical value that each substance has. The coefficient of static friction for which coefficient a foamed molded product is measured depends on a substance that is present on a surface of the foamed molded product. Expandable polystyrene-based resin particles become a foamed molded product through a pre-expansion step and an expansion molding step. Note, however, that a copolymer that has been subjected to the pre-expansion step and the expansion molding step does not change in internal and external composition. Thus, the coefficient of static friction depends on a kind and a contained amount of the polysiloxane-containing macro monomer that is present on the surfaces of the expandable polystyrene-based resin particles.

One or more embodiments can be arranged as below.

[1] Expandable polystyrene-based resin particles containing: a styrene-based monomer; a polysiloxane-containing macro monomer; and a coating composition having a melting point of not lower than 40° C., a coefficient of static friction of a foamed molded product, obtained by pre-expanding the expandable polystyrene-based resin particles and molding the expandable polystyrene-based resin particles pre-expanded, being not more than 4.0.

[2] The expandable polystyrene-based resin particles recited in [1], wherein the coating composition is one of a fatty acid triglyceride, a fatty acid diglyceride, a fatty acid monoglyceride, and a vegetable oil, or a mixture of two or more of the fatty acid triglyceride, the fatty acid diglyceride, the fatty acid monoglyceride, and the vegetable oil.

[3] The expandable polystyrene-based resin particles recited in [1] or [2], wherein the polysiloxane-containing macro monomer has at least one functional group at respective both terminals thereof and/or in a side chain thereof.

[4] The expandable polystyrene-based resin particles recited in any one of [1] through [3], wherein the at least one functional group of the polysiloxane-containing macro monomer is a vinyl group.

[5] The expandable polystyrene-based resin particles recited in any one of [1] through [4], wherein, of 100 parts by weight, which is a total amount of the styrene-based monomer and the polysiloxane-containing macro monomer, the styrene-based monomer accounts for not less than 89.0 parts by weight and not more than 99.2 parts by weight, and the polysiloxane-containing macro monomer accounts for not less than 0.8 parts by weight and not more than 11.0 parts by weight.

[6] The expandable polystyrene-based resin particles recited in any one of [1] through [5], wherein the expandable polystyrene-based resin particles have a surface layer part which contains polysiloxane as a main component.

[7] Pre-expanded polystyrene-based particles obtained by pre-expanding expandable polystyrene-based resin particles recited in any one of [1] through [6].

[8] A foamed molded product obtained by molding pre-expanded polystyrene-based particles recited in [7].

Furthermore, one or more embodiments can be arranged as below.

A one or more embodiments relate to expandable polystyrene-based resin particles containing: a styrene-based monomer; a polysiloxane-containing macro monomer; and a coating composition applied to surfaces of the expandable polystyrene-based resin particles and having a melting point of not lower than 40° C., a coefficient of static friction of a foamed molded product, obtained by pre-expanding the expandable polystyrene-based resin particles and molding the expandable polystyrene-based resin particles pre-expanded, being not more than 4.0.

One or more embodiments relate to the expandable polystyrene-based resin particles of one or more embodiments, wherein the coating composition applied to the surfaces of the expandable polystyrene-based resin particles and having a melting point of not lower than 40° C. is one of a fatty acid triglyceride, a fatty acid diglyceride, and a fatty acid monoglyceride, or a mixture of two or more of the fatty acid triglyceride, the fatty acid diglyceride, and the fatty acid monoglyceride.

EXAMPLES

The following description will discuss Examples and Comparative Examples. Note, however, that the present invention is not limited by the following Examples.

<Gpc Measurement>

A gel component was filtered out from resultant expandable polystyrene-based resin particles after 0.02 g of the resultant expandable polystyrene-based resin particles were dissolved in 20 mL of tetrahydrofuran (hereinafter may be abbreviated as "THF"). Then, gel permeation chromatography (GPC) was used to carry out GPC measurement, under the conditions below, with respect to only a component that was soluble in THF. Then, a GPC measurement chart, a weight average molecular weight (Mw), and a number average molecular weight (Mn) were obtained. Note that obtained values were relative values in terms of polystyrene.
Measuring device: high-speed GPC device HLC-8220 manufactured by TOSOH CORPORATION
Used column: SuperHZM-H×2, SuperH-RC×2 manufactured by TOSOH CORPORATION
Column temperature: 40° C., Mobile phase: THF (tetrahydrofuran)
Flow rate: 0.35 mL/minute, Pouring amount: 10 µL
Detector: RI <Measurement of Thickness of Polysiloxane Layer of Expandable Polystyrene-Based Resin Particles>

In order that an unreacted polysiloxane-containing macro monomer was removed, 2 g of expandable polystyrene-based resin particles were weighed out and the expandable polystyrene-based resin particles were separated into matters insoluble in ethanol and matters soluble in ethanol. The matters insoluble in ethanol were further separated into matters insoluble in hexane and matters soluble in hexane, and the matters insoluble in hexane were used to carry out TEM observation. A cross section including surfaces of the expandable polystyrene-based resin particles was subjected to the TEM observation by preparing an ultrathin section with use of an ultramicrotome under a frozen condition and measuring 10 thicknesses of a layer of the cross section, which layer contained polysiloxane as a main component, so as to calculate an average of the thicknesses.
Preparation of frozen ultrathin section (cryoultramicrotome)
Device: FC6 manufactured by Leica
Transmission electron microscope (TEM)
Device: H-7650 manufactured by Hitachi High-Technologies Corporation
Observation condition: acceleration voltage of 100 kV <Production of Pre-Expanded Particles>

Expandable polystyrene-based resin particles having been classified with use of a sieve so as to have a predetermined particle size were pre-expanded, with use of a pressure pre-expanding machine "BHP manufactured by Obiraki Industry Co., Ltd." under a blowing vapor pressure of 0.09 MPa to 0.12 MPa, so that a volume magnification of 45 times was achieved. Thereafter, the expandable polystyrene-based resin particles thus pre-expanded were left under a normal temperature for one day, so that pre-expanded styrene-based particles having a volume magnification of 45 times were obtained.

<Production of Foamed Molded Product>

The pre-expanded styrene-based particles were molded in a mold with use of a molding machine "KR-57 manufactured by DAISEN Co., Ltd." under a blowing vapor pressure of 0.07 MPa, so that a plate-like foamed molded product having a thickness of 25 mm, a length of 400 mm, and a width of 350 mm was obtained.

<Surface Property of Foamed Molded Product>

A state of a surface of the foamed molded product was evaluated by visual observation. A greater numerical value refers to a beautiful surface state in which the surface had fewer or no gaps between particles. Not less than 3 points out of 5 was judged to be passed.
5: No gap between particles was found in the surface.
4: The surface partially had gaps between particles, but the gaps were hardly noticeable.
3: The surface had, here and there, gaps between particles, but the gaps were permissible as a whole.
2: Gaps between particles were noticeable.
1: The surface had many gaps between particles.

<Evaluation of Fusibility>

The foamed molded product was split, and a split surface was observed. A percentage of broken particles (not broken interfaces between particles) was found. Then, fusibility of the foamed molded product was determined by the following criteria.
Passed: A percentage of the broken particles was not less than 70%.
Failed: A percentage of the broken particles was less than 70%.

<Measurement of Coefficient of Static Friction>

The foamed molded product was cut, with use of a vertical slicer (manufactured by SAKURA Engineering.), into test pieces each having a length of 60 mm, a width of 60 mm, and a thickness of 4 mm and having a skin layer on one side.

The test pieces were left to stand for 12 hours in a steady temperature and humidity room having a temperature of 23° C. and a humidity of 50%. Thereafter, in the steady temperature and humidity room, a test piece and an iron plate were rubbed together back and forth 10 times with use of a surface property tester HEIDON Type: 14FW (manufactured by Shinto Scientific Co., Ltd.) under conditions of a load of 200 g, a back-and-forth rubbing distance of 50 mm, and a sliding rate of 3000 mm/minute. Then, an average of 10 coefficients of static friction was found, the 10 coefficients having been obtained while the test piece and the iron plate were being rubbed together back and forth 10 times.

<Measurement of Rubbing Sound>

The foamed molded product was cut, with use of a vertical slicer (manufactured by SAKURA Engineering.), into rectangular test pieces each having a length of 300 mm, a width of 60 mm, and a thickness of 25 mm and having skin layers on both sides. The foamed molded product was also cut into triangular test pieces each having a base of 120 mm, a height of 60 mm, and a thickness of 25 mm and having skin layers on both sides. The rectangular test pieces and the triangular test pieces were left to stand for 12 hours in a steady temperature and humidity room having a temperature of 23° C. and a humidity of 50%. Thereafter, in the steady temperature and humidity room, a rectangular test piece and a triangular test piece were placed as below. Specifically, on the rectangular test piece, the triangular test piece was placed so that a corner of the triangular test piece came into contact with the rectangular test piece. Then, a load of 2000 g was placed on the triangular test piece. The test pieces thus placed were moved back and forth 10 times at a rate of 6000 mm/minute in a section having a width of 50 mm.

Rubbing sounds produced during the back-and-forth movement of the test pieces were picked up with use of a highly directional microphone, and ranges and sound pressures of the rubbing sounds were measured. A sound pressure was found which had the greatest difference from a sound pressure of an ambient sound in a range of not less than 5000 Hz and not more than 20,000 Hz, at which a human feels annoyed.

<Burning Rate>

Samples having a length of 356 mm, a width of 101.6 mm, and a thickness of 12 mm were cut from the foamed molded product with use of a hot wire slicer, so that test pieces for a burning test were obtained. A burning rate was evaluated with use of the test pieces by a method conforming to Federal Motor Vehicle Safety Standards FMVSS302.

A spreading velocity of flame was found based on the following equation.

Burning rate (mm/min.)=60×(D/T)

D: Distance traveled by flame (mm) (in a case where the flame spread to the end, 25.4 cm)

T: Time required for spread of flame (second)

The burning rate was evaluated by the following criteria.

Good: The flame self-distinguished before reaching a marked line.

Poor: The burning rate was more than 80 mm/min.

<Kind of Polysiloxane-Containing Macro Monomer Used>

MPS: side chain type methacryloyl-containing polysiloxane (molecular weight: 200,000, viscosity: unclear, number of functional groups: 7.5, functional group equivalent: 9,300 g/mol)

X-22-164B: both terminal type methacryloyl-containing polysiloxane (molecular weight: 3,500, viscosity: 55 mm$^2$/s, number of functional groups: 2.1, functional group equivalent: 1,630 g/mol) (manufactured by Shin-Etsu Silicone)

KF-2012: one terminal type methacryloyl-containing polysiloxane (molecular weight: 4,000, viscosity: 60 mm$^2$/s, number of functional groups: 0.8, functional group equivalent: 4,600 g/mol) (manufactured by Shin-Etsu Silicone)

<Kind of Coating Composition Used>

Hardened castor oil: castor wax, melting point: 84° C. (manufactured by Nichiyu Corporation)

VT-50: triglyceride stearate, RIKEMAL VT-50, melting point: 67° C. (manufactured by Riken Vitamin Co. Ltd.)

S-100: monoglyceride stearate, RIKEMAL S-100, melting point: 67° C. (manufactured by Riken Vitamin Co. Ltd.)

Limonene: (R)-(+)-limonene, melting point: −74° C. (manufactured by Wako Pure Chemical Industries, Ltd.)

Coconut oil: melting point: 25° C.

DBS: dibutyl sebacate, melting point: −11° C. (manufactured by Wako Pure Chemical Industries, Ltd.)

Example 1

<Production of Polystyrene-Based Resin Seed Particles>

In a reactor provided with a stirrer, 100 parts by weight of pure water, 0.4 parts by weight of tricalcium phosphate, 0.01 parts by weight of sodium dodecylbenzene sulfonate, 0.5 parts by weight of sodium chloride, and 0.07 parts by weight of polyethylene wax as a nucleating agent were placed. A resultant mixture was stirred, so that an aqueous suspension was prepared. Thereafter, 0.2 parts by weight of benzoyl peroxide as a polymerization initiator and 0.2 parts by weight of 1,1-bis(t-butylperoxy)cyclohexane as a polymerization initiator were dissolved in 100 parts by weight of a styrene-based monomer, and a resultant mixture was added to the reactor. A resultant mixture was heated to 98° C. and then polymerization was carried out over 4.5 hours. Thereafter, a resultant polymerized product was cooled and then taken out so as to be dehydrated and dried. Subsequently, a resultant product was sieved, so that polystyrene-based resin seed particles having a particle size of 0.4 mm to 0.5 mm were obtained.

<Production of Expandable Polystyrene-Based Resin Particles>

Into a 6 L autoclave provided with a stirrer, 167 parts by weight of pure water, 1.2 parts by weight of tricalcium phosphate, 0.022 parts by weight of α-olefin sodium sulfonate, 0.2 parts by weight of sodium chloride, 0.04 parts by weight of t-butylperoxy-2-ethylhexyl monocarbonate (ten-hour half-life temperature: 99° C.), and parts by weight of polystyrene-based resin seed particles having a particle size of 0.4 mm to 0.5 mm were fed. Thereafter, a resultant mixture started to be stirred. Subsequently, the mixture was heated to 90° C., and then polymerization was carried out while 0.22 parts by weight of a 30% benzoyl peroxide solution was being fed into the reactor over 5 hours and 78.5 parts by weight of a styrene-based monomer was being fed into the reactor over 5 hours and 30 minutes. During the polymerization, when addition of the styrene-based monomer was ended (after 5 hours had passed since the end of heating to 90° C.), 1.5 parts by weight of methacryloyl-containing polysiloxane (methacryloyloxy propyl dimethoxymethylsilane content: 2.5% by weight, molecular weight: 200,000) and 0.075 parts by weight of di-t-butylperoxy hexahydroterephthalate were fed into the reactor over 1 hour and 30 minutes, and 90° C. was maintained for 30 minutes. Thereafter, the temperature (i.e., 90° C.) was raised to 120° C. and maintained for 1 hour. Then, the temperature was reduced to 98° C., and 1.0 part by weight of cyclohexane and 6.5 parts by weight of normal rich butane (normal butane: 70%, isobutane: 30%) were fed into the reactor. The temperature was further raised to 110° C., maintained for 1.5 hours, and then reduced to 40° C. A suspension was taken out so as to be dehydrated, dried, and classified. Thus, expandable polystyrene-based resin particles having a particle size of 0.6 mm to 1.15 mm were obtained.

The expandable polystyrene-based resin particles were sieved, so that expandable polystyrene-based resin particles having a particle size of 0.5 mm to 1.0 mm were obtained. Thereafter, 0.15 parts by weight of hardened castor oil was added to 100 parts by weight of the expandable polystyrene-based resin particles, and a resultant mixture was stirred and mixed in a plastic bag. Furthermore, a resultant product was pre-expanded with use of a pressure pre-expanding machine "BHP-300 (manufactured by Obiraki Industry Co., Ltd)", so that pre-expanded particles having a volume magnification of 45 times were obtained. The pre-expanded particles were cured at a room temperature for one day. Thereafter, a foamed molded product was obtained with use of a molding machine "KR-57 (manufactured by DAISEN Co., Ltd.)" and a mold having a size of 300 mm×450 mm×25 (t) mm. Then, a surface property, a coefficient of static friction, and a rubbing sound of the foamed molded product were evaluated. Evaluation results are shown in Table 1.

Examples 2 to 12, Comparative Examples 1 to 6

As shown in Table 1, Examples 2 to 12 and Comparative Examples 1 to 6 each obtained expandable polystyrene-based resin particles, pre-expanded particles, and a foamed molded product as in the case of Example 1 except that Examples 2 to 12 and Comparative Examples 1 to 6 each changed, for example, a kind of a polysiloxane-containing macro monomer, an amount of the polysiloxane-containing macro monomer, a timing at which to add the polysiloxane-containing macro monomer, and a time for which to add the polysiloxane-containing macro monomer; and a kind of an addition initiator and an amount of the addition initiator. Then, Examples 2 to 12 and Comparative Examples 1 to 6 each carried out an evaluation similar to that carried out in Example 1.

Example 13

Into a 6 L autoclave provided with a stirrer, 167 parts by weight of pure water, 1.2 parts by weight of tricalcium phosphate, 0.022 parts by weight of α-olefin sodium sulfonate, 0.2 parts by weight of sodium chloride, 0.04 parts by weight of t-butylperoxy-2-ethylhexyl monocarbonate (ten-hour half-life temperature: 99° C.), and parts by weight of polystyrene-based resin seed particles having a particle size of 0.4 mm to 0.5 mm were fed. Thereafter, a resultant mixture started to be stirred. Subsequently, 3.0 parts by weight of Pyro-Guard SR-130 (manufactured by Dai-ichi Kogyo Seiyaku Co., Ltd.) as a flame retarder and 0.6 parts by weight of dicumyl peroxide were dissolved in 10 parts by weight of styrene. Then, a resultant mixture was added to the above suspension. Thereafter, a resultant mixture was maintained at 60° C. for 1 hour, and then 0.03 parts by weight of a 30% benzoyl peroxide solution was added to the mixture. Then, the temperature was raised to 90° C. and maintained for 1 hour and 30 minutes. Subsequently, polymerization was carried out while 0.2 parts by weight of a 30% benzoyl peroxide solution was being fed into the reactor over 4 hours and 30 minutes and 68 parts by weight of a styrene-based monomer was being fed into the reactor over 4 hours and 50 minutes. During the polymerization, when addition of the styrene-based monomer was ended (after 4 hours and 20 minutes had passed since the end of heating to 90° C.), 2.0 parts by weight of methacryloyl-containing polysiloxane (methacryloyloxy propyl dimethoxymethylsilane content: 2.5% by weight, molecular weight: 200,000) and 0.1 parts by weight of di-t-butylperoxy hexahydroterephthalate were fed into the reactor over 2 hours, and 90° C. was maintained for 30 minutes. Example 13 carried out subsequent operations as in the case of Example 1. Evaluation results are shown in Table. 1.

Example 14

Into a 6 L autoclave provided with a stirrer, 96 parts by weight of pure water, 0.17 parts by weight of tricalcium phosphate, 0.048 parts by weight of α-olefin sodium sulfonate, 3.0 parts by weight of a brominated butadiene-styrene copolymer ("EMERALD 3000" manufactured by Chemtura Corporation, bromine content: 64%) as a flame retarder, 0.2 parts by weight of dicumyl peroxide as an auxiliary flame retarder, 0.1 parts by weight of benzoyl peroxide as a polymerization initiator, 0.37 parts by weight of t-butylperoxy-2-ethylhexyl monocarbonate as a polymerization initiator, and 1.4 parts by weight of coconut oil as a plasticizing agent were fed. Thereafter, 98 parts by weight of styrene was fed into the autoclave, and a resultant mixture was heated to 98° C. so as to be subjected to polymerization. After 2 hours had passed since the start of polymerization, 0.10 parts by weight of tricalcium phosphate was added to the mixture. Then, a resultant mixture was subjected to polymerization for 5 hours. Subsequently, 2.0 parts by weight of methacryloyl-containing polysiloxane (methacryloyloxy propyl dimethoxymethylsilane content: 2.5% by weight, molecular weight: 200,000) and 0.1 parts by weight of di-t-butylperoxy hexahydroterephthalate were added to the mixture over 2 hours, and a resultant mixture was further subjected to polymerization for 30 minutes. Furthermore, 1.0 part by weight of cyclohexane and 6.5 parts by weight of normal rich butane (normal butane: 70%, isobutane: 30%) as an expanding agent were fed into the autoclave. A resultant mixture was heated to 120° C. so that impregnation of the expanding agent and polymerization were carried out for 4 hours. Thereafter, a resultant product was cooled to 40° C. and then washed, dehydrated, and dried, so that expandable polystyrene-based resin particles were obtained.

The expandable polystyrene-based resin particles were sieved, so that expandable polystyrene-based resin particles having a particle size of 0.5 mm to 1.0 mm were obtained. Example 13 carried out subsequent operations as in the case of Example 1. Evaluation results are shown in Table. 1.

Example 15

Example 15 was carried out as in the case of Example 2 except that in Example 15, (i) instead of 78.0 parts by weight of the styrene-based monomer, a total of 78.0 parts by weight of a monomer obtained by mixing, in advance, 73.0 parts by weight of a styrene-based monomer and 5.0 parts by weight of butyl acrylate was added to a reactor over 5 hours and 30 minutes and (ii) 2.0 parts by weight of methacryloyl-containing polysiloxane and 0.1 parts by weight of di-t-butylperoxy hexahydroterephthalate were fed into the reactor over 2 hours. Evaluation results are shown in Table 1.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

TABLE 1

|  |  |  | Example 1 | Example 2 | Example 3 | Example 4 | Example 5 | Example 6 |
|---|---|---|---|---|---|---|---|---|
| Polymerization Condition | Polymerization method | — | — | Seed | Seed | Seed | Seed | Seed | Seed |
|  | Amount of styrene-based monomer | Part by weight | 98.5 | 98.0 | 97.5 | 95.0 | 93.0 | 90.0 |
|  | Butyl acrylate | Part by weight | 0 | 0 | 0 | 0 | 0 | 0 |
|  | Kind of flame retarder | — | — | — | — | — | — | — |
|  | Amount of flame retarder | Part by weight | 0 | 0 | 0 | 0 | 0 | 0 |

TABLE 1-continued

|  |  |  |  |  |  |  |  |  |
|---|---|---|---|---|---|---|---|---|
|  | Kind of polysiloxane-containing macro monomer | — | MPS | MPS | MPS | X-22-164B | X-22-164B | X-22-164B |
|  | Polysiloxane weight average molecular weight | $10^4$ g/mol | 20 | 20 | 20 | 0.35 | 0.35 | 0.35 |
|  | Amount of polysiloxane-containing monomer | Part by weight | 1.5 | 2.0 | 2.5 | 5.0 | 7.0 | 10.0 |
|  | Addition initiator | Part by weight | 0.075 | 0.100 | 0.125 | 0.250 | 0.350 | 0.500 |
|  | Polysiloxane addition time | Minute | 90 | 120 | 150 | 300 | 420 | 600 |
| External additive | Kind of external additive | — | Hardened castor oil | Hardened castor oil | Hardened castor oil | Hardened castor oil | Hardened castor oil | Hardened castor oil |
|  | Amount of external additive | Part by weight | 0.15 | 0.15 | 0.15 | 0.15 | 0.15 | 0.15 |
|  | Melting point of external additive | °C. | 84 | 84 | 84 | 84 | 84 | 84 |
| Physical property of resin | Gel component | wt % | 13 | 14 | 15 | 25 | 32 | 40 |
|  | Thickness of polysiloxane layer | nm | 100 | 130 | 150 | Unmeasured | Unmeasured | Unmeasured |
|  | Weight average molecular weight(*1) | $10^4$ g/mol | 26 | 25 | 22 | 28 | 27 | 25 |
| Evaluation of molded product | Surface property of molded product | — | 5 | 4 | 3 | 3 | 3 | 3 |
|  | Fusibility | % | 95 | 95 | 95 | 95 | 95 | 95 |
|  | Rubbing sound | dB | 7 | 1 | 1 | 3 | 5 | 3 |
|  | Coefficient of static friction | — | 3.1 | 2.0 | 1.5 | 2.3 | 2.0 | 1.7 |
|  | FMVSS302 | Evaluation | Unevaluated | Unevaluated | Unevaluated | Unevaluated | Unevaluated | Unevaluated |

|  |  |  | Example 7 | Example 8 | Example 9 | Example 10 | Example 11 | Example 12 |
|---|---|---|---|---|---|---|---|---|
| Polymerization Condition | Polymerization method | — | Seed | Seed | Seed | Seed | Seed | Seed |
|  | Amount of styrene-based monomer | Part by weight | 98.0 | 98.0 | 98.0 | 98.0 | 98.0 | 98.0 |
|  | Butyl acrylate | Part by weight | 0 | 0 | 0 | 0 | 0 | 0 |
|  | Kind of flame retarder | — | — | — | — | — | — | — |
|  | Amount of flame retarder | Part by weight | 0 | 0 | 0 | 0 | 0 | 0 |
|  | Kind of polysiloxane-containing macro monomer | — | KF-2012 | MPS | MPS | MPS | MPS | MPS |
|  | Polysiloxane weight average molecular weight | $10^4$ g/mol | 0.37 | 20 | 20 | 20 | 20 | 20 |
|  | Amount of polysiloxane-containing monomer | Part by weight | 2.0 | 2.0 | 2.0 | 2.0 | 2.0 | 2.0 |
|  | Addition initiator | Part by weight | 0.100 | 0.100 | 0.100 | 0.100 | 0.100 | 0.100 |
|  | Polysiloxane addition time | Minute | 120 | 120 | 120 | 120 | 120 | 120 |
| External additive | Kind of external additive | — | Hardened castor oil | Hardened castor oil | Hardened castor oil | VT-50 | VT-50 | S-100 |
|  | Amount of external additive | Part by weight | 0.15 | 0.10 | 0.05 | 0.15 | 0.05 | 0.05 |
|  | Melting point of external additive | °C. | 84 | 84 | 84 | 67 | 67 | 67 |
| Physical property of resin | Gel component | wt % | 0 | 14 | 14 | 14 | 14 | 14 |
|  | Thickness of polysiloxane layer | nm | Unmeasured | 130 | 130 | 130 | 130 | 130 |
|  | Weight average molecular weight(*1) | $10^4$ g/mol | 29 | 25 | 25 | 25 | 25 | 25 |
| Evaluation of molded product | Surface property of molded product | — | 4 | 4 | 4 | 4 | 4 | 4 |
|  | Fusibility | % | 95 | 85 | 70 | 95 | 70 | 70 |
|  | Rubbing sound | dB | 11 | 1 | 1 | 1 | 1 | 1 |
|  | Coefficient of static friction | — | 3.3 | 2.0 | 2.0 | 2.0 | 2.0 | 2.0 |
|  | FMVSS302 | Evaluation | Unevaluated | Unevaluated | Unevaluated | Unevaluated | Unevaluated | Unevaluated |

TABLE 1-continued

|  |  |  | Example 13 | Example 14 | Example 15 | Comparative Example 1 | Comparative Example 2 |
|---|---|---|---|---|---|---|---|
| Polymerization Condition | Polymerization method | — | Seed | Seed | Suspension | Seed | Seed |
|  | Amount of styrene-based monomer | Part by weight | 98.0 | 98.0 | 93.0 | 100.0 | 99.5 |
|  | Butyl acrylate | Part by weight | 0 | 0 | 5 | 0 | 0 |
|  | Kind of flame retarder | — | SR-130(*2) | EME3K(*3) | — | — | — |
|  | Amount of flame retarder | Part by weight | 3 | 3 | 0 | 0 | 0 |
|  | Kind of polysiloxane-containing macro monomer | — | MPS | MPS | MPS | — | MPS |
|  | Polysiloxane weight average molecular weight | $10^4$ g/mol | 20 | 20 | 20 | — | 20 |
|  | Amount of polysiloxane-containing monomer | Part by weight | 2.0 | 2.0 | 2.0 | 0.0 | 0.5 |
|  | Addition initiator | Part by weight | 0.100 | 0.100 | 0.100 | 0.000 | 0.025 |
|  | Polysiloxane addition time | Minute | 120 | 120 | 120 | — | 30 |
| External additive | Kind of external additive | — | Hardened castor oil | Hardened castor oil | Hardened castor oil | Hardened castor oil | Hardened castor oil |
|  | Amount of external additive | Part by weight | 0.15 | 0.15 | 0.15 | 0.15 | 0.15 |
|  | Melting point of external additive | °C. | 84 | 84 | 84 | 84 | 84 |
| Physical property of resin | Gel component | wt % | 13 | 13 | 13 | 0 | 8 |
|  | Thickness of polysiloxane layer | nm | Unmeasured | Unmeasured | 130 | 0 | Unmeasured |
|  | Weight average molecular weight(*1) | $10^4$ g/mol | 25 | 25 | 25 | 28 | 28 |
| Evaluation of molded product | Surface property of molded product | — | 4 | 4 | 4 | 5 | 5 |
|  | Fusibility | % | 95 | 90 | 95 | 95 | 95 |
|  | Rubbing sound | dB | 1 | 1 | 1 | 45 | 35 |
|  | Coefficient of static friction | — | 2.0 | 2.0 | 2.0 | 4.2 | 4.2 |
|  | FMVSS302 | Evaluation | Good | Good | Unevaluated | Unevaluated | Unevaluated |

|  |  |  | Comparative Example 3 | Comparative Example 4 | Comparative Example 5 | Comparative Example 6 |
|---|---|---|---|---|---|---|
| Polymerization Condition | Polymerization method | — | Seed | Seed | Seed | Seed |
|  | Amount of styrene-based monomer | Part by weight | 98.0 | 98.0 | 98.0 | 98.0 |
|  | Butyl acrylate | Part by weight | 0 | 0 | 0 | 0 |
|  | Kind of flame retarder | — | — | — | — | — |
|  | Amount of flame retarder | Part by weight | 0 | 0 | 0 | 0 |
|  | Kind of polysiloxane-containing macro monomer | — | MPS | MPS | MPS | MPS |
|  | Polysiloxane weight average molecular weight | $10^4$ g/mol | 20 | 20 | 20 | 20 |
|  | Amount of polysiloxane-containing monomer | Part by weight | 2.0 | 2.0 | 2.0 | 2.0 |
|  | Addition initiator | Part by weight | 0.100 | 0.100 | 0.100 | 0.100 |
|  | Polysiloxane addition time | Minute | 120 | 120 | 120 | 120 |

TABLE 1-continued

| | | | | | | |
|---|---|---|---|---|---|---|
| External additive | Kind of external additive | — | — | Limonene | Coconut oil | DBS |
| | Amount of external additive | Part by weight | 0.00 | 0.05 | 0.05 | 0.05 |
| | Melting point of external additive | ° C. | — | −74 | 25 | −11 |
| Physical property of resin | Gel component | wt % | 14 | 14 | 14 | 14 |
| | Thickness of polysiloxane layer | nm | 130 | 130 | 130 | 130 |
| | Weight average molecular weight(*1) | $10^4$ g/mol | 25 | 25 | 25 | 25 |
| Evaluation of molded product | Surface property of molded product | — | 4 | 4 | 4 | 4 |
| | Fusibility | % | 5 | 5 | 5 | 5 |
| | Rubbing sound | dB | 1 | 1 | 1 | 1 |
| | Coefficient of static friction | — | 2.0 | 2.0 | 2.0 | 2.0 |
| | FMVSS302 | Evaluation | Unevaluated | Unevaluated | Unevaluated | Unevaluated |

(*1) Only matter soluble in THF
(*2) SR-130: Pyro-Guard SR-130 (manufactured by Dai-ichi Kogyo Seiyaku Co., Ltd.)
(*3) EME3K: EMERALD 3000 (manufactured by Chemtura Corporation)

What is claimed is:

1. Expandable polystyrene-based resin particles, comprising:
   a styrene-based monomer;
   a polysiloxane-containing macro monomer; and
   a coating composition having a melting point of 40° C. or greater,
   wherein:
   the polysiloxane-containing macro monomer has a functional group in a side chain of the polysiloxane-containing macro monomer,
   a coefficient of static friction of a foamed molded product, obtained by pre-expanding the expandable polystyrene-based resin particles and molding the pre-expanded expandable polystyrene-based resin particles, is 4.0 or less,
   the expandable polystyrene-based resin particles have a surface layer part that contains polysiloxane as a main component, and
   the expandable polystyrene-based resin particles are a copolymer of the styrene-based monomer and the polysiloxane-containing macro monomer.

2. The expandable polystyrene-based resin particles according to claim 1, wherein the coating composition is one or more selected from the group consisting of a fatty acid triglyceride, a fatty acid diglyceride, a fatty acid monoglyceride, and a vegetable oil.

3. The expandable polystyrene-based resin particles according to claim 1, wherein the functional group is a vinyl group.

4. The expandable polystyrene-based resin particles according to claim 1, wherein the particles contain the styrene-based monomer in an amount of 89.0 to 99.2 parts by weight and the polysiloxane-containing macro monomer in an amount of 0.8 to 11.0 parts by weight, where the total amount of the styrene-based monomer and the polysiloxane-containing macro monomer is 100 parts by weight.

5. Pre-expanded polystyrene-based particles obtained by pre-expanding the expandable polystyrene-based resin particles of claim 1.

6. A foamed molded product obtained by molding the pre-expanded polystyrene-based particles of claim 5.

* * * * *